Patented Sept. 30, 1952

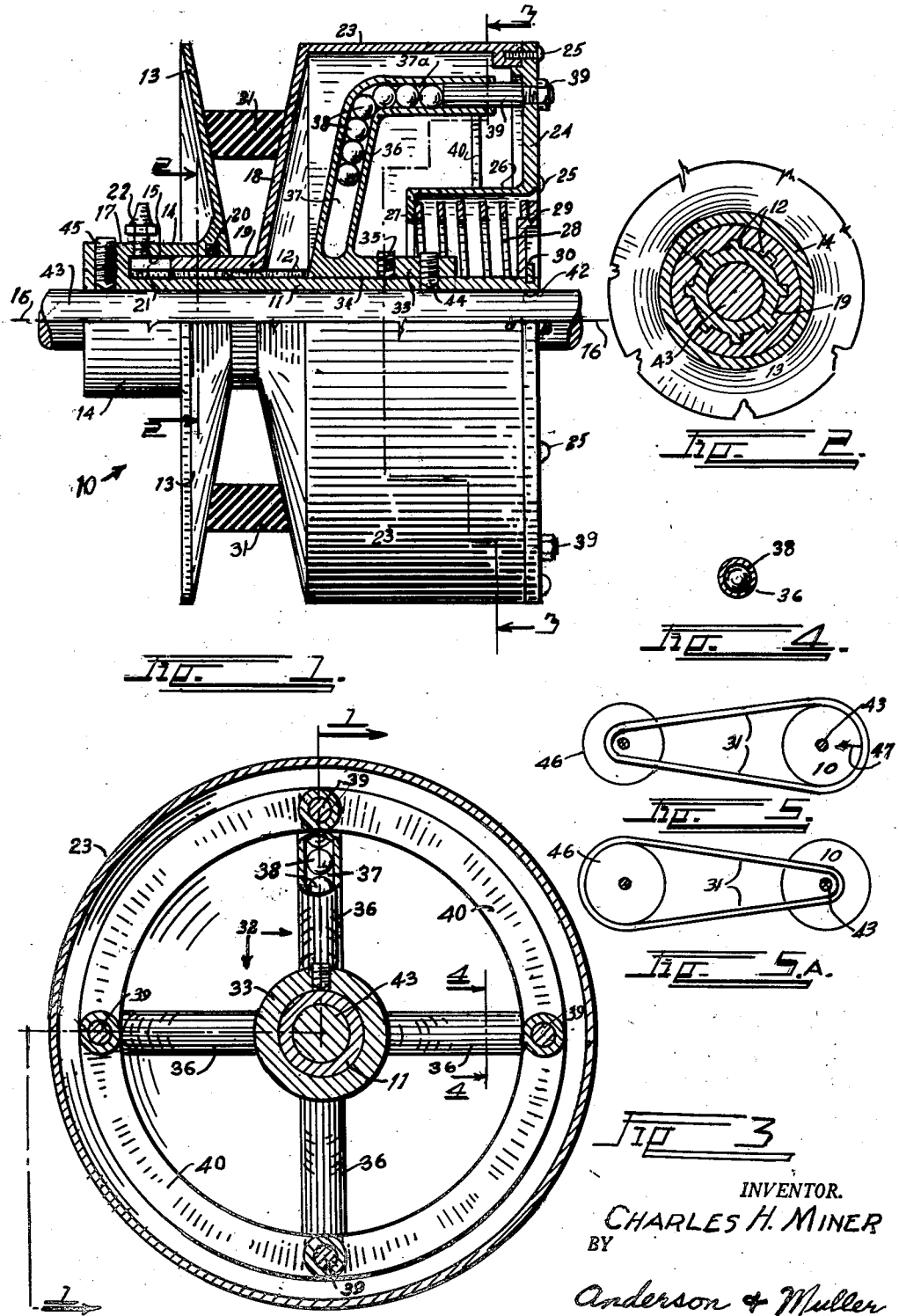

2,612,055

UNITED STATES PATENT OFFICE 2,612,055

VARIABLE PITCH PULLEY

Charles Hugh Miner, Denver, Colo.

Application July 26, 1950, Serial No. 175,931

4 Claims. (Cl. 74—230.17)

This invention relates to V-belt power transmission systems and more particularly to variable pitch pulleys employed therewith.

In certain V-belt power transmission systems, particularly those in which the drive and driven pulleys are disposed on fixed center distances, it is common practice to provide a drive pulley which increases in effective pitch diameter in response to increase in its speed and to provide a driven pulley having relatively movable side flanges which are spring urged in a direction such that they tend to provide a maximum effective pitch diameter. When the drive pulley is rotating at a predetermined low speed it is at minimum effective pitch diameter and the driven pulley is at maximum effective pitch diameter. As the drive pulley increases in speed it approaches maximum effective pitch diameter and the driven pulley approaches minimum effective pitch diameter, but as the latter does so the force of the flanges on the V-belt increases due to increase in the urge of the resilient actuating means forming a part of the driven pulley.

One of the objects of the invention is to provide a transmission system of the type above referred to in which the driven pulley is provided with centrifugally responsive means for assisting in moving it to smaller effective pitch diameter with increase in speed thereof and to obviate unnecessary and objectionable side pressure on the belt.

Another object is to provide a novel driven pulley for use in the systems referred to.

Another object is to control the effective pitch diameter of the pulley by a centrifugal force exerted by a train of contacting spherical members.

Another object is to centrifugally actuate a plurality of spherical members in such manner that the centrifugal forces acting on certain of them becomes ineffective to produce a force on one end of the train, at certain speeds of operation.

A further object is to provide a driven pulley which minimizes certain wear on its moving parts which latter causes improper relative positioning of its belt contacting flanges.

Still further objects, advantages, and salient features will become more apparent from a consideration of the description to follow, the appended claims, and the accompanying drawing, in which:

Figure 1 is a side elevation and longitudinal section through a V-pulley, the section being taken on line 1—1, Figure 3;

Figure 2 is a section taken on line 2—2, Figure 1;

Figure 3 is a section taken on line 3—3, Figure 1;

Figure 4 is a section taken on line 4—4, Figure 3; and

Figures 5 and 5A diagrammatically illustrate a V-belt power transmission system utilizing the subject of the invention, the relative positioning of the parts being at two different speeds of operation.

Referring in detail to the drawing, the pulley 10 comprises an elongated hub 11 having a plurality of integral splines 12 spaced peripherally and extending longitudinally thereof. One side flange 13 of the pulley is connected to a sleeve 14 having a smooth cylindrical bore 15 therein, this sleeve being disposed concentric with the pulley axis 16 and rigidly secured to one end of the sleeve by a connecting collar 17.

A movable side flange 18 is rigidly secured to a sleeve 19, the outer surface of the latter telescopically fitting bore 15 so that it is free to slide but is snug and without play therein. The inner surface is splined to snugly fit splines 12. A packing such as O-ring 20 disposed in an annular groove in sleeve 14 prevents loss of lubricant which is contained in space 21 and also prevents foreign matter from entering bore 15. A grease gun fitting 22 is threadedly connected to sleeve 14 for filling space 21 with grease or other suitable lubricant.

A cylindrical tubular housing 23 is integrally secured at one end thereof to the peripheral edge of flange 18, its other end being substantially closed by a plate 24 secured to the housing by a plurality of screws 25. Plate 24 is provided with a cup-shaped portion 26 terminating with an annular flange 27 against which abuts one end of a compression coil spring 28, the other end of the spring abutting a cup washer 29, retained on hub 11 by a snap ring 30 which removably engages a groove in the hub. As will be apparent, spring 28 urges flange 19 toward flange 13 and tends to move V-belt 31 radially outward to a position wherein the pulley has a maximum effective pitch diameter.

A centrifugal device 32 opposes the force of the spring just described, this device comprising a hub 33 having a cylindrical bore 34 which fits hub 11 and is secured to the latter by a set screw 35. A plurality of spoke-like members 36 are integrally formed on the hub, these members each having a substantially radial circular channel 37 which joins a circular channel 37a, the latter being parallel with axis 16. A plurality of metal balls 38 are disposed in the channels, and form a train adapted to exert a force against pins 39 fixedly secured to plate 24. A ring 40, formed integral with the centrifugal device, joins the horizontal channels and aids in retaining them in proper alignment, this member being optional and not required if the channels are otherwise sufficiently rigid.

Hub 11 is provided with a circular bore 42 which receives a driven shaft 43, the hub being secured thereto in any suitable manner such as by set screws 44, 45.

In the operation of the transmission it will be assumed that the drive pulley 46 (see Figures 5 and 5A) is of a type which automatically increases in effective pitch diameter with increase in angular velocity, such type of pulley being exemplified by my Patent Number 2,496,061 and my copending application, Serial No. 81,909, now Patent Number 2,553,505, of which the present application forms a continuation-in-part. In Figure 5 the drive pulley 46, just referred to, is operating at low speed and has a relatively small effective pitch diameter, driven pulley 10 having a maximum effective pitch diameter. As drive pulley 46 increases in angular velocity its side flanges finally assume a position wherein the pulley is at maximum effective pitch diameter and the driven pulley 10 is at minimum effective pitch diameter, the speed ratio between the pulleys, of course, changing between these limits. If the centrifugal device 32 were not provided, the full urge of spring 28 in its compressed state would be applied to side flange 18 and to the belt 31 tending to urge it outwardly thus unnecessarily tensioning the belt. Since the power transmitted by a belt is a function of the difference in tension between the two runs thereof, it is desirable to tension the so-called "slack" side no more than is necessary to pull the load to thus minimize the tension in the tension or load carrying run of the belt. The centrifugal device of this invention is adapted to attain this result by reducing the unnecessary tension in the tension or driving run of the belt by opposing the urge of spring 28 as this spring urge tends to increase with increase in angular velocity of the driven member.

It will be observed that when one of the balls 38 enters channel 37a it no longer applies any centrifugal controlling force to a pin 39 and the effective centrifugal force is only that applied by the balls remaining in radial channel 37. By the choice of the number of balls this controlling force can be limited. For example, if all balls are in channel 37 at a predetermined speed, except one, this latter ball, or only a portion of its effective weight, is utilized to apply a controlling force to the ball train. Further, the controlling force at any predetermined speed may be varied by varying the number of balls and their relative weights. Some of the balls, for example, may be of steel or other relatively heavy material and others of aluminum, or the like, of relatively light material. The controlling force will also vary depending on the position of the balls in the train. If one or more balls of light material are disposed in channels 38 at a particular speed of rotation and heavy balls are disposed in channels 37a, this provides a different controlling force than if the balls be reversed in position. The invention therefore contemplates the use of various numbers of balls in the channels and balls of different weight disposed in any relationship in the ball trains.

The hub construction 11, 12, 14, 19, etc. is also an important feature of the invention. It will be apparent that the tension on the runs of the belt tends to wedge flanges 13, 18 apart, this force being effective at a point and in a direction indicated by arrow 47, Figure 5. This force, of course, is moving circumferentially of the pulley and if there is any play in the spline connection 12, flange 18 will constantly wobble on such connection, the beating or brinelling action breaking down any lubricant film on the splines and resulting in rapid wear. Prior art pulleys have been subject to the foregoing disadvantage since no adequate provision has been made to effectively lubricate the splines. Also, where it has been possible to apply lubricant thereto no provision has been made to prevent excessive lubricant from flying outward onto the belt, this causing rapid belt deterioration and/or belt slippage. This invention obviates these disadvantages since hub 19, sleeve 14, and seal 20 provide a lubricant reservoir 21 which maintains the spline properly lubricated at all times. The snug telescopic fit of hub 19 in sleeve 14 also steadies flange 18 against forces tending to wobble it which in turn prevents a break-down of the lubricant film on the splines.

Having described the invention, what I claim as new is:

1. A variable ratio pulley, comprising, a pair of axially aligned members having juxtaposed faces of a shape to engage the sides of a V-belt therebetween, the width of the faces in a radial direction being substantially in excess of the thickness of the belt, means connecting the members together in a manner such that they rotate in unison, but are relatively movable axially, resilient means urging the members toward each other, means rotatable with the pulley responsive to centrifugal force opposing a portion of the urge of the resilient means, the last named means having a fixed mass, and comprising a channel extending outwardly from the axis of the pulley, joined at its outer end to a channel extending parallel with the axis, and a plurality of contacting members movable within the channels.

2. A pulley in accordance with claim 1 wherein the contacting members are composed of spherical balls, adapted to move in series in the channels in a manner such that each ball contacts an adjacent ball to form a chain through which force may be exerted, the end ball in the parallel extending channel applying a controlling force substantially equal to the centrifugal force of a ball or balls disposed in the outwardly extending channel.

3. A pulley in accordance with claim 2 wherein the controlling force is applied to a pin disposed in the parallel extending channel, the pin being of substantially the same diameter as the ball that it abuts and connected to one of the aligned members for conjoint movement therewith.

4. A variable ratio pulley, comprising, a pair of axially aligned members having juxtaposed faces of a shape to engage the sides of a V-belt therebetween, the width of the faces in a radial direction being substantially in excess of the thickness of the belt, means connecting the members together in a manner such that they rotate in unison, but are relatively movable axially, resilient means urging the members toward each other, means rotatable with the pulley responsive to centrifugal force for applying an opposing force to a portion of the urge of the resilient means, the last named means comprising guide means extending outwardly from the axis of rotation and joined at the outer end thereof to second guide means extending in a direction angularly related to the direction of the first guide means, a mass of fixed weight movable along both guide means forming a chain through which force may be exerted, the outer end of the chain being adapted to apply said opposing force, the angular relationship of the two guide means being such that the opposing force is substantially equal to the centrifugal force exerted by only that portion of the mass disposed along the first named guide means when the member is rotating with portions of the mass disposed along both guide means.

CHARLES HUGH MINER.

REFERENCES CITED

The following references are of record in the file of this patent:

UNITED STATES PATENTS

| Number | Name | Date |
| --- | --- | --- |
| 2,034,666 | Reeves | Mar. 17, 1936 |
| 2,158,367 | Henney | May 16, 1939 |
| 2,161,894 | Bishop | June 13, 1939 |
| 2,278,739 | Reeves | Apr. 7, 1942 |
| 2,294,777 | Heyer | Sept. 1, 1942 |
| 2,336,002 | Everett | Dec. 7, 1943 |
| 2,459,378 | Hallinan | Jan. 18, 1949 |
| 2,496,061 | Miner | Jan. 31, 1950 |
| 2,553,505 | Miner | May 15, 1951 |

FOREIGN PATENTS

| Number | Country | Date |
| --- | --- | --- |
| 885,742 | France | Sept. 23, 1943 |